(12) United States Patent
Sipes, Jr. et al.

(10) Patent No.: US 9,972,961 B2
(45) Date of Patent: May 15, 2018

(54) TWO-ENDED PUMPING OF A COMPOSITE FIBER OPTIC AMPLIFIER

(71) Applicant: OPTICAL ENGINES, INC., Colorado Springs, CO (US)

(72) Inventors: Donald L. Sipes, Jr., Colorado Springs, CO (US); Jason D. Tafoya, Colorado Springs, CO (US); Daniel Scott Schulz, Colorado Springs, CO (US)

(73) Assignee: OPTICAL ENGINES, INC., Colorado Springs, CO (US)

( * ) Notice: Subject to any disclaimer, the term of this patent is extended or adjusted under 35 U.S.C. 154(b) by 0 days. days.

(21) Appl. No.: 15/192,389

(22) Filed: Jun. 24, 2016

(65) Prior Publication Data

US 2016/0380403 A1    Dec. 29, 2016

Related U.S. Application Data

(63) Continuation-in-part of application No. 15/191,829, filed on Jun. 24, 2016.
(Continued)

(51) Int. Cl.
| | |
|---|---|
| *H01S 3/094* | (2006.01) |
| *H01S 3/067* | (2006.01) |
| *H01S 3/16* | (2006.01) |
| *G02B 6/14* | (2006.01) |
| *H01S 3/0941* | (2006.01) |
| *G02B 6/02* | (2006.01) |
| *G02B 6/024* | (2006.01) |

(52) U.S. Cl.
CPC ......... *H01S 3/094011* (2013.01); *G02B 6/14* (2013.01); *H01S 3/06712* (2013.01); *H01S 3/06741* (2013.01); *H01S 3/06758* (2013.01); *H01S 3/094007* (2013.01); *G02B 6/024* (2013.01); *G02B 6/02009* (2013.01); *H01S 3/0941* (2013.01); *H01S 3/1618* (2013.01); *H01S 2301/03* (2013.01)

(58) Field of Classification Search
CPC ...... G02B 6/14; G02B 6/024; G02B 6/02009; H01S 3/06712; H01S 3/06758; H01S 3/06783
See application file for complete search history.

(56) References Cited

U.S. PATENT DOCUMENTS

| | | | |
|---|---|---|---|
| 4,900,114 A * | 2/1990 | Mortimore | G02B 6/262 385/43 |
| 6,275,627 B1 * | 8/2001 | Wu | G02B 6/2551 385/123 |

(Continued)

FOREIGN PATENT DOCUMENTS

| | | | | |
|---|---|---|---|---|
| JP | 02015040992 A1 * | 3/2015 | | G02B 6/04 |

*Primary Examiner* — Eric L Bolda
(74) *Attorney, Agent, or Firm* — Leydig, Voit & Mayer, Ltd.

(57) ABSTRACT

Exemplary embodiments of the disclosure include a fiber optic amplifier system and a fiber optic oscillator system having a first stage, comprising a first core fiber having a first core diameter and a first cladding size; a second stage, comprising a second core fiber having a second core diameter and a second cladding size; and a double mode adapter connecting the first stage to the second stage, wherein the double mode adapter is configured to provide transitions for the cores and the claddings of the first and second core fibers.

14 Claims, 4 Drawing Sheets

Related U.S. Application Data

(60) Provisional application No. 62/184,339, filed on Jun. 25, 2015, provisional application No. 62/186,745, filed on Jun. 30, 2015, provisional application No. 62/184,338, filed on Jun. 25, 2015, provisional application No. 62/186,736, filed on Jun. 30, 2015.

(56) References Cited

U.S. PATENT DOCUMENTS

| | | | | |
|---|---|---|---|---|
| 6,324,326 | B1* | 11/2001 | Dejneka | G02B 6/1228 359/341.1 |
| 2003/0016441 | A1* | 1/2003 | Leplingard | H01S 3/06758 359/341.1 |
| 2005/0122574 | A1* | 6/2005 | Kakui | H01S 3/06754 359/341.1 |
| 2007/0115541 | A1* | 5/2007 | Rogers | H01S 3/06754 359/345 |
| 2008/0219299 | A1* | 9/2008 | Lewis | H01S 3/06758 372/6 |
| 2011/0032604 | A1* | 2/2011 | Rothenberg | G02B 6/02042 359/341.4 |
| 2011/0249321 | A1* | 10/2011 | Savage-Leuchs | G02B 6/02009 359/341.3 |
| 2015/0138630 | A1* | 5/2015 | Honea | H01S 3/06758 359/341.3 |

\* cited by examiner

TWO-ENDED PUMPING OF A COMPOSITE FIBER OPTIC AMPLIFIER

CROSS-REFERENCE TO RELATED APPLICATIONS

This patent application is a continuation-in-part of copending U.S. patent application Ser. No. 15/191,829, filed Jun. 24, 2016, titled "Double Fiber Optic Mode Adapter," which claims the benefit of U.S. Provisional Patent Application No. 62/184,339, filed Jun. 25, 2015, and U.S. Provisional Patent Application No. 62/186,745, filed Jun. 30, 2015.

This patent application claims the benefit of U.S. Provisional Patent Application No. 62/184,338, filed Jun. 25, 2015, and U.S. Provisional Patent Application No. 62/186,736, filed Jun. 30, 2015.

All of the foregoing applications are incorporated herein by reference in their entireties.

STATEMENT REGARDING FEDERALLY SPONSORED RESEARCH AND DEVELOPMENT

This invention was made with Government support under Grant Number FA9451-13-M-0334 awarded by the Air Force Research Laboratory. The Government has certain rights in this invention.

BACKGROUND

The semiconductor-pumped fiber laser has generated considerable interest for High Energy Lasers (HELs) in a number of Directed Energy (DE) Ballistic Missile Defense System (BMDS) applications, including long range sensing, communications, and missile defense. The potential efficiency, compact size, low weight, reliability and ruggedness are attractive for these and other DE applications.

SUMMARY

Exemplary embodiments of the invention include a fiber optic amplifier system and a fiber optic oscillator system having a first stage, comprising a first core fiber having a first core diameter and a first cladding size; a second stage, comprising a second core fiber having a second core diameter and a second cladding size; and a double mode adapter connecting the first stage to the second stage, wherein the double mode adapter is configured to provide transitions for the cores and the claddings of the first and second core fibers.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
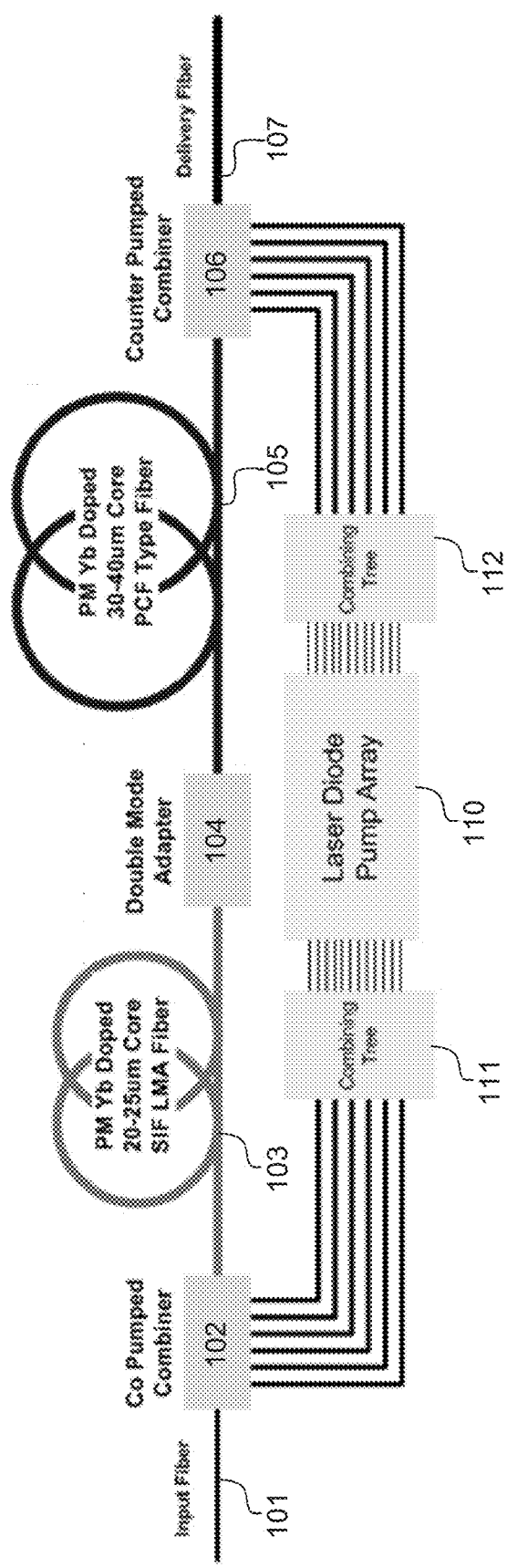
FIG. 1 is a schematic diagram illustrating a pump combiner in an exemplary embodiment.

For semiconductor-pumped fiber lasers in DE applications, it would be advantageous for all-fiber semiconductor pumped fiber laser designs to be able to, in a single gain stage, produce narrow linewidth amplified signals at the multi-kW power level with near-diffraction-limited beam quality. An important component is thus the all-fiber pump power combiner. To achieve reliable operation at multi-kW power levels and efficient multi-kW pump integration, active gain fibers with large pump cladding diameters should be used. These large pump cladding diameters in turn utilize the combination of several pump fibers with an even larger input bundle diameter. In addition, the core is transferred through the combiner, adapting to the larger core of the active fiber while preserving the polarization extinction ratio of the input signal. Finally, the combiner is integrated with advanced gain fibers in a near-diffraction-limited counter-pumped configuration, and packaged in a robust manner that is thermally robust and stable.

While certain all-fiber combiners exist commercially, they are of low input bundle diameters, are co-pumped, cannot provide mode adaption for large gain cores, and cannot handle multi-kW power levels. Embodiments of the invention, on the other hand, provide a systems approach to DE fiber laser pump integration that is able to seamlessly integrate multi-kW levels of pump light simultaneously in both the co- and counter-pumped directions in both Large Mode Area (LMA) step index fiber (SIF) and Photonic Crystal Fiber (PCF).

Exemplary embodiments of the invention, which provide efficient, high-power-capable fiber-laser integration, may utilize the etched taper all-fiber pump combiner technology described in U.S. Pat. No. 8,818,151, which is incorporated by reference herein in its entirety. The efficient, high-power-capable fiber-laser integration provides for co- and counter-pumping along with a low loss transfer of energy between integrated gain stages. Exemplary embodiments of the invention may further utilize the double mode adapter technology described in U.S. patent application Ser. No. 15/191,829, filed Jun. 24, 2016, titled "Double Fiber Optic Mode Adapter," which is incorporated by reference herein in its entirety.

For fiber-based amplifiers in DE applications, it is advantageous for the pump to be tightly integrated into the amplifier design. Exemplary embodiments of the invention provide the ability to both co- and counter-pump, and to couple more than one gain stage together without the use of isolators, so as to provide power amplifiers with high gain, high thresholds for both Stimulated Brillouin scattering (SBS) and modal instability (MI), and high extraction efficiency. Pump combiners according to exemplary embodiments are highly efficient for both signal and pump, and have an efficient mode adapter to move from a small input core to a large output core, and have the signal core mode matching to microstructured fibers with large cores and advanced designs.

Because SBS may be addressed by having a larger core, while MI favors having a smaller core, exemplary embodiments provide an architecture that allows for a smaller core fiber to transition into a larger core using a mode adapter.

Exemplary embodiments further address pumping mismatches by utilizing a double mode adapter which provides for a transition for the fiber cladding in which co-pumped and/or counter-pumped light travels.

FIG. 1 is a schematic diagram illustrating a pump combiner 100 in an exemplary embodiment. The pump combiner 100 includes input fiber 101, co-pumped combiner 102, core fiber 103, double mode adapter 104, core fiber 105, counter-pumped combiner 106, delivery fiber 107, laser diode pump array 110, combining tree 111, and combining tree 112.

Input fiber 101, for example, may correspond to a low-power precise seed source (e.g., in the mW levels where it is efficient to be able to modulate and control key parameters of signal light such as optical phase, and to be able to pulse the input signal light at very high speeds or very short pulses).

Co-pumped combiner 102, for example, may be a high-power co-pumped combiner with a built-in mode adapter from the input signal.

Core fiber 103, for example, may be a polarization-maintaining (PM) Yb doped 20-25 μm core SIF LMA fiber. This is an example of a relatively small core for the input where fiber non-linearities are not an issue because the signal level is small (i.e., the input has yet to be really amplified, which suppresses the onset of TMI).

Double mode adapter 104 matches the two gain stages in both the core and cladding to allow for efficient transmission of the signal from the first stage pump combiner 100 to the second stage of the pump combiner 100, and for bi-direction pump flow of the pump light between the stages to create dual-pumped configurations for both stages. Thus, the double mode adapter 104 provides for low-loss signal transport and exchange of pump light between stages. The double mode adapter facilitates both the use of differing gain stages with a large mismatch allowing the fiber amplifier to be better optimized for higher power performance. If only a signal mode adapter were used and there was a large pump clad mismatch, the pump light would have to be removed before the mode adapter leading to a far more complicated device. In an exemplary embodiment, the double mode adapter 104 includes a continuous mode adapter from a 20 μm input core to a 40 μm PCF gain fiber core.

A general desire of fiber lasers and fiber amplifiers is to increase the power output of the laser while maintaining the properties that existed at low powers; namely, near diffraction limited beam quality, narrow line width, short pulses, etc. Working against this are fiber optical non-linearities such as Stimulated Brillioun Scattering (SBS), Stimulated Raman Scattering (SRS), Thermal Modal Instabilities (TMI), and Self Phase Modulation (SPM). All of these non-linearities except the TMI can be reduced by going to larger fiber core diameters. Avoiding TMI, on the other hand, requires smaller fiber diameters. It is therefore desirable to begin the amplifier with a smaller diameter (when the signal level is low and yet to be amplified) and then transition to a larger core fiber when the signal levels are much higher near the output of the amplifier. Exemplary embodiments of the invention thus provide amplifiers with two or more different gain sections where the mismatch in both core and pump clad can be considerable. The double mode adapter 104 provides a smooth, efficient transition of the signal fiber through the different types of gain fiber and also allows pump light to flow efficiently between the gain fiber sections in different embodiments, e.g., where there is co-pumping only, counter-pumping only, or pumping from both ends.

Core fiber 105, for example, may be a PM Yb doped 30-40 μm core PCF type fiber. This is an example of a relatively large diameter core fiber which reduces fiber non-linearities.

Counter-pumped combiner 106, for example, may be a high-power counter-pumped combiner for both PCF and LMA SIF fibers that provides low loss and high power capability. Many fiber non-linearities are reduced through counter pumping where the gain of the fiber better matches the signal level at a particular point along the amplifier.

Delivery fiber 107, may be, for example, an undoped piece of fiber that is used to connect the amplifier to the place where the amplified light is to be used (the needs for powering, cooling and coiling the gain fiber of a fiber laser or fiber amplifier often lead to the gain fiber being set apart from the place where the output light is being used to create a desired effect).

Laser diode pump array 110, for example, may include a plurality of pump laser diodes with a set output power and output fiber type, and may provide for powering and cooling of the pump laser diodes of the array.

Combining trees 111, 112 facilitate matching the pump clad in the gain fiber in a manner that is governed by the Law of Conservation of Brightness. An example of this would be starting with a 100 W laser diode that emits light in a 105/125 um 0.15 NA fiber. Seven of these laser diodes can be combined into a single 220/240 um 0.22 NA fiber with approximately 95% efficiency. Then, six of these combined fiber would be placed into a pump bundle with the signal fiber in the center of the bundle into a 20/400 um 0.46 NA Yb doped gain fiber to allow for a total of 42 diode pump lasers (at a total of 4200 W minus combining efficiencies) in the laser diode pump array 110, with the combining tree, to pump the gain fiber.

Although the exemplary embodiment depicted in FIG. 1 depicts both a first stage with co-pumping and a second stage with counter-pumping, it will be appreciated that in one alternative embodiment, the system may only provide the first stage being co-pumped without the second stage being counter-pumped and, in another alternative embodiment, the system may only provide the second stage being counter-pumped without the first stage being co-pumped. Thus, in the co-pumping only embodiment, counter-pumped combiner 106 and combining tree 112 (and the corresponding connections) may not be needed, and, in the counter-pumping only embodiment, co-pumped combiner 102 and combining tree 111 may not be needed.

Adjusting fiber lengths and pump wavelengths allows for balancing of the co- and counter-pump levels. The resulting gain distribution in the fiber is determined by the input pump power, the absorption of the gain fiber (typically determined by the material absorption of the lasing ion (e.g. Yb2+) multiplied by the ratio of the doped core to pump clad areas), and the length of the gain fiber. The pump and hence gain distribution is an exponentially decreasing level from the pump input. This pump absorption is also wavelength dependent as an electron transition is the source of the pump absorption. Co-pumped light creates an exponentially decreasing gain profile beginning at the input of the fiber and decreasing towards the output end of the fiber. Counter-pumping similarly creates an exponentially decreasing gain profile beginning at the output of the fiber and decreasing towards the input end. Utilizing both types of pumping creates a profile that is the sum of the two gain profiles. By varying the wavelength of the pump light, and the concentration of the dopant ion, the core to clad area ratio, and the relative lengths of the two types of fiber, a gain profile that maximizes laser efficiency while minimizing non linear effects may be achieved.

In an exemplary embodiment, by utilizing high-power counter-pumping, Stimulated Brillouin scattering (SBS) and modal instability (MI) thresholds may be increased. The counter-pumped combiner and double mode adapter interfacing to a PCF fiber, as well as the fiber pumping and balancing discussed above, may achieve high gain with high SBS and MI thresholds while maximizing overall efficiency. Differing gain fibers for the first section of the amplifier and the second section of the amplifier (power-stage) may be used to achieve an optimal combination of low gain in the second section of the amplifier (power-stage) to reduce MI and SBS effects and reduce the SBS overlap to increase SBS threshold.

In an exemplary embodiment, a very short unpolarized taper section has no identifiable stresses such that light exiting a 25 µm PM core is transferred to the polarization-maintaining (PM) PCF core with >20 dB extinction ratio. In many applications, it is desirable to have the polarization of the light maintained in the amplifier and have the light come out of the amplifier highly polarized. To achieve this, Polarizing (PZ) fiber, or Polarization Maintaining (PM) fiber, may be used for the gain fiber and for the input and delivery fibers. The thermally tapered or etched tapered regions do not generally work well with these polarized fibers, so a short section of unpolarized fiber that is held straight (not bent) may be used to maintain the polarization state from one section of fiber to the next.

In an exemplary embodiment, an all-glass construction using the "optical heat spreading" technology described in U.S. patent application Ser. No. 14/158,469, which is incorporated by reference herein in its entirety, may be used to provide a reliable and robust combiner at multi-kW pump power levels. This is because combiners and double mode adapters are generally not 100% efficient. At kW levels, even 1 W of scattered light can be absorbed and turn into a significant amount of heat, potentially leading to burning of the fiber. Since the primary source of the heat is scattered light, actually insulating the device in a transparent material and spreading the light away from the fiber before it interacts with an absorbing material helps to protect the fiber. In this way, the density of the heat and hence the temperature is reduced.

In practice, exemplary implementations of the pump combiner 100 have been produced using the following processes and components: capillary sleeve collapse and bundling, fiber etching, and splicing to PCF, with respect to 6+1 to 1 combiner with a 650 µm input bundle to 325 µm PCF co-propagating configuration, and with respect to a 1.3 mm to 500 µm PCF fiber co-propagating configurations, as well as with respect to a counter-pumping configuration. The fiber combiners are comprised of three different sections: (1) the fiber bundle that brings the pump fibers together with the signal fibers, (2) the output fiber that connects with the gain fiber and (3) a transition region that brightness transforms the pumps to the pump clad and mode adapts the input signal fiber core to the fiber core of the gain fiber. In the pump bundle the pump fibers are held in the desired relative positions (signal fiber in the center and pump fibers in a ring around the signal fiber) with very little stress on them so as not to distort the fibers and the light contained within those fibers. A glass capillary is collapsed on the bundle through a heating and pulling process, the bundle is then cleaved and or polished to create a flat and clean surface for splicing, and the transition fiber is created through either thermally taper-ing the starting transition fiber, etch tapering the transition fiber, or some combination of the two processes. Finally, the bundle is fusion spliced to the transition taper fiber and then this assembly is fusion spliced to the output fiber.

These exemplary implementations have demonstrated that a >99% efficient pump combiner, as well as LMA counter-pumped combiners with >99% signal efficiency, can be produced according to exemplary embodiments of the invention. Further, pump transfer efficiencies of >99%, core signal efficiencies of >80% (in a co-propagating configuration with a continues mode field adapter (MFA)), and polarization extinction ratios of 20 dB, have been demonstrated. Additionally, such pump combiners, as well as completed amplifier harnesses incorporating such pump combiners, have been qualified at multi-kW levels and passed environmental tests for shock and vibration, and have been power-tested with 1.5 kW of cw pumps for tens of minutes with no adverse effects.

It will be appreciated that the configuration shown in FIG. 1 depicts an amplifier. In an alternative embodiment, this configuration may be modified to provide an oscillator by providing a mirror to the left of fiber 101 and a partially-reflecting mirror to the right of fiber 107.

Embodiments of the pump combiner discussed herein may be incorporated into various applications, including, for example, optimized two-stage fiber amplifier harnesses and balanced dual-pumped two-stage integrated power amplifiers.

In fiber lasers and fiber amplifiers, it is desirable not only to match signal core light but also to match pump light into a double-clad fiber laser or amplifier gain fiber. Exemplary embodiments of the invention relate to a double fiber optic mode adapter for matching fibers having different core diameters as well as differing clad dimensions.

A laser of any type is characterized by three key constituents: a gain medium that has an element with an atomic structure characterized by long lived upper electron states, a pump source whose energy is such that the substance in the gain medium can be excited to this upper state, and either a mirrored resonator structure to create an oscillator, or an input source to create an amplifier. A fiber laser or amplifier is a subset of this definition where the pump source is a laser diode and the gain medium is typically a Rare Earth doped glass with a fiber optic guiding structure. A fiber laser or amplifier can be created by way of a double clad fiber: there is a fiber optic core typically in the 5-50 um diameter range with low numerical aperture such that a laser propagating mode of typical of near diffraction limited beam quality. Surrounding this central fiber signal propagation core is another guiding region typically in the 100 um to 500 um in diameter and is typically of high numerical aperture. In this way the pump light is injected into this cladding guided region of the fiber and as it propagates, portions pass through the rare earth doped core where it is absorbed. In this way the fiber laser or fiber amplifier is pumped to create the conditions necessary for laser action.

A major challenge towards creating laser amplifiers is delivering both the signal input light and the pump light to the gain medium in an efficient manner where it can propagate down the length of the fiber. There is often a large mismatch in fiber core diameter between the input signal and the gain fiber. Simply splicing these two dissimilar fibers together will result in transition with unacceptable loss. To smooth this transition, exemplary embodiments of the invention provide a double mode adapter where the fiber with the larger core is thermally tapered downward such that the diameter is reduced to match the diameter of the smaller fiber core. If this transition is made not too abruptly, the light from the smaller core can grow to match the larger core and transfer efficiently to the larger core fiber. Efficient coupling of pump and signal light into the gain portion of the fiber amplifier typically involves transitioning a small core fiber from the input into a larger core in the gain fiber. At the same time, exemplary embodiments of the invention provide for transforming the larger diameter low numerical aperture (NA) of the pumps into the smaller diameter and higher NA of the pump cladding.

To accomplish this, exemplary embodiments utilize two techniques at different portions of a double mode adapter. The first involves thermal tapering where heat is applied to the fiber and when the fiber gets close to its melting point the fiber is pulled and both the core and the clad of the fiber are reduced by the same proportion. The other technique involves etching the outside of the fiber in a way that the outer diameter of the fiber is reduced while the core is left untouched. By using these techniques together, embodiments of the invention provide for the advantage of being able to transform the core and the clad independently of each other to satisfy the transition requirements for both the pump and the signal.

One exemplary approach considered by the inventors for creating a double fiber optic mode adapter involved creating a single taper that combines both the tapering of the core and the opposite etching of the cladding to achieve both mode adaptations. In this approach, the transition fiber is thermally tapered to match the input signal, with the thermally-tapered cladding then being etched to provide the proper transition for the pump light in the cladding.

Figure 2:
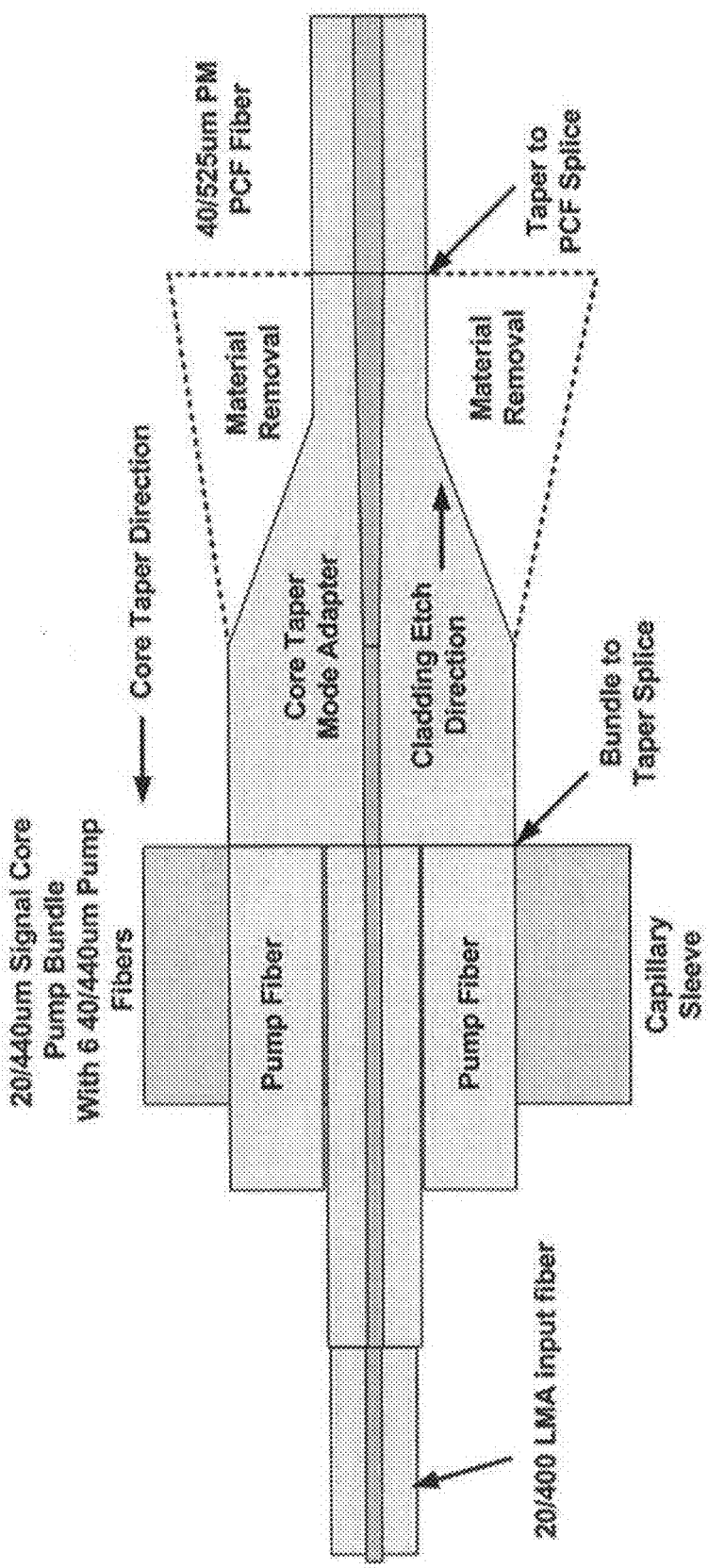
FIG. 2 is a schematic diagram illustrating an exemplary double fiber optic mode adapter.

FIG. 2 is a schematic diagram illustrating an exemplary double fiber optic mode adapter 200 based on this approach. The double fiber optic mode adapter may also be referred to as a double taper mode adapter or double taper pump combiner. In this example, a 20 µm core fiber from a prior amplifier stage is expanded to a mode field compatible with low loss coupling with a 40 µm core Photonic Crystal Fiber (PCF) fiber. The resulting tapered fiber is then etched with an adiabatic shape to achieve a desired pump taper.

Figure 3:
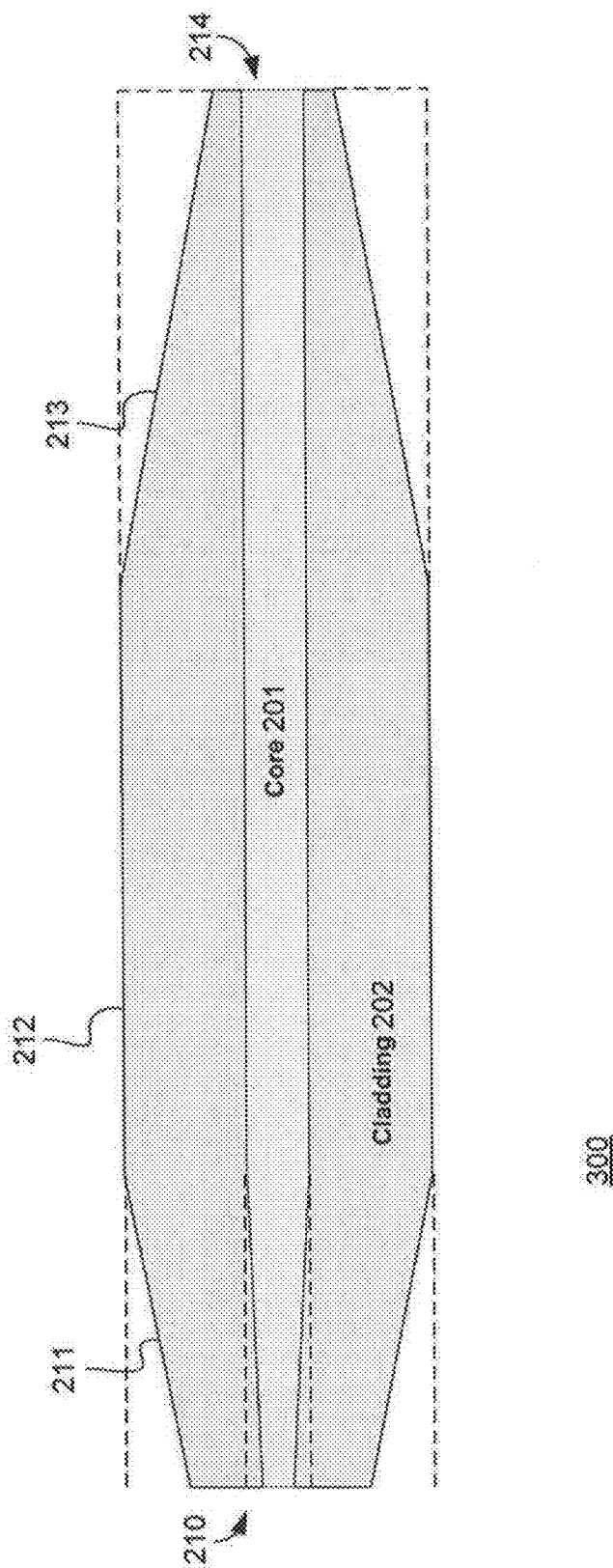
FIG. 3 is a schematic diagram illustrating another exemplary double fiber optic mode adapter.

FIG. 3 is a schematic diagram illustrating another exemplary double fiber optic mode adapter 300, with separate thermal taper and etched taper regions. The exemplary double fiber optic mode adapter 300 may further include an original fiber region, but it will be appreciated that the original fiber region is not required.

In FIG. 3, in the thermal taper region 211, the cladding 202 is tapered with the core 201 (via thermal tapering) such that the core 201 matches the core of an input signal fiber (not depicted) at input face 210. In the etched taper region 213, the cladding 202 is tapered to match the cladding dimensions of a PCF gain fiber (not depicted), which may be, for example, an air-clad PCF gain fiber, while the core 201 in the etched taper region 213 is unaffected by the tapering in the etched taper region 213 (via etching). The double fiber optic mode adapter 200 may further include an original fiber region 212 where neither the core 201 nor the cladding 202 is tapered.

Based on the structure depicted in FIG. 3, pump light adiabatically expands in the thermal taper region 211 and contracts in the etched taper region 213, while the signal light in the fiber core 201 also expands adiabatically in the thermal taper region 211 but is unchanged in the etched taper region 213. By appropriate application of the thermal tapering and etching shown in FIG. 3, the resulting ratios of core to clad diameters can be achieved over a wide range of ratios.

Figure 4:
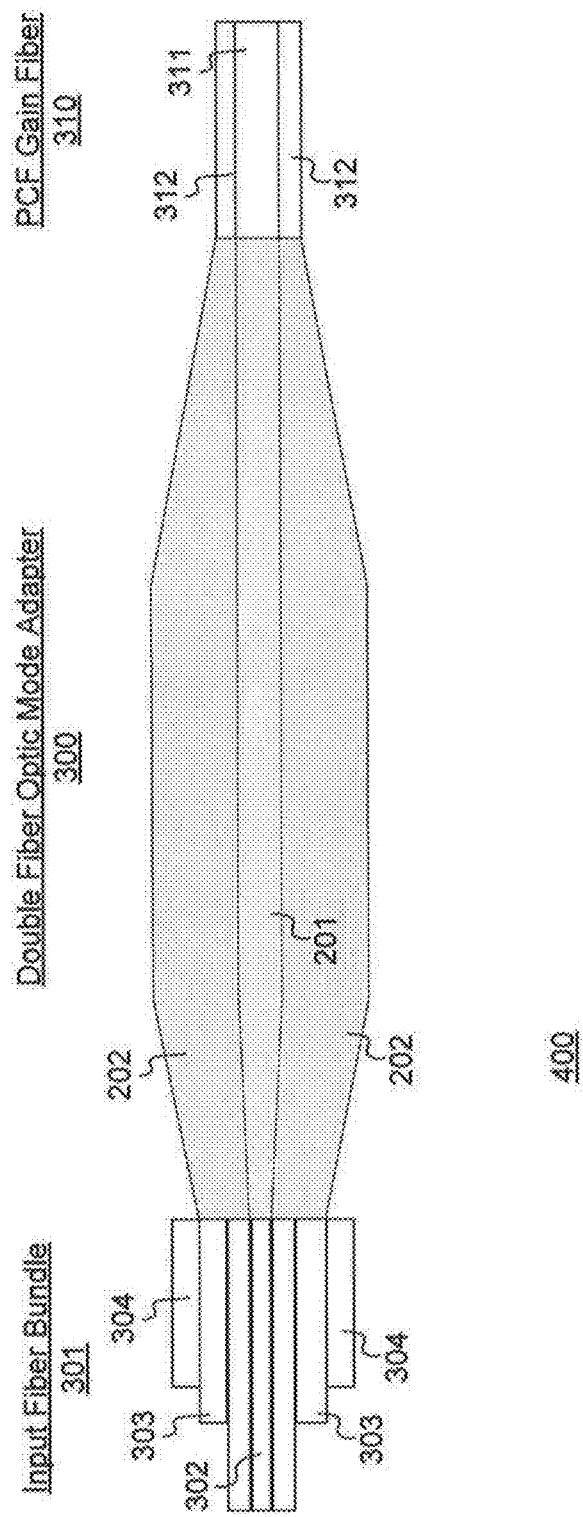
FIG. 4 is a schematic diagram illustrating an exemplary environment for an exemplary double fiber optic mode adapter in an exemplary embodiment of the invention.

FIG. 4 illustrates an exemplary environment 300 in which the double fiber optic mode adapter 300 may be used. In this exemplary environment, for the input face 210 of double fiber optic mode adapter 200, the cladding diameter of the double fiber optic mode adapter 300 is set to match an input pump bundle such that pump fibers 303 are configured to input pump light into cladding 202, and the core diameter for core 201 of the double fiber optic mode adapter 200 is set to match the core diameter for core 301 of an input signal fiber of the input pump bundle. This may be achieved via thermal tapering in the thermal taper region 211 of the double fiber optic mode adapter 200. It will be appreciated that the thermal tapering causes the dimensions of both the cladding 202 and the core 201 of the transition fiber forming the double fiber optic mode adapter 200 to become smaller. It will further be appreciated that the cladding diameter may set to be slightly larger than the diameter of the cores of the pump fibers to allow some tolerance (but not so much larger that the brightness or Etendue is unnecessarily lost).

For the output face 214, the cladding diameter for cladding 202 of the double fiber optic mode adapter 300 is set to match the cladding 312 of a PCF gain fiber 310, and the core diameter for core 201 of the double fiber optic mode adapter 300 matches the core diameter for core 311 of the PCF gain fiber 310. This may be achieved through etching in the etched taper region 213 of the double fiber optic mode adapter 300. It will be appreciated that the etching is applied to the cladding of the transition fiber forming the double fiber optic mode adapter 300 and leaves the core of the transition fiber forming the double fiber optic mode adapter 300 unchanged. It will further be appreciated that the pump fibers 303 may be surrounded by a capillary sleeve 304, which should be collapsed around the pump fibers 303 in a way that does not distort the fiber leading to loss of pump signal or poor transitioning of the signal light into the gain fiber.

In the original fiber region 212, the core diameter of the double fiber optic mode adapter 300 matches the core diameter of the PCF gain fiber at the output face 214. In an exemplary implementation, the cladding diameter in the original fiber region 212 is simply the original diameter of the transition fiber used for the double fiber optic mode adapter 300 (i.e., the diameter of the transition fiber without being subjected to thermal tapering or etching). In this exemplary implementation, the size of the transition fiber used for the double fiber optic mode adapter 300 is selected based on the transition that needs to be accomplished between the input signal fiber and the core of the PCF gain fiber such that thermally tapering the transition fiber at the input face 210 causes both the cladding and the core of the transition fiber to match the input pump bundle.

In an exemplary implementation, the input fiber bundle 301 may be a 20/240 µm signal core with six 220/240 µm 0.22 NA pump fibers, and the PCF fiber may be a 30/400 µm 0.55 NA Air Clad polarization-maintaining (PM) PCF fiber. In another exemplary implementation, a double mode adapter may provide an efficient transition between the pump and signal combined on a 10/125 um 0.22 NA fiber to a 40/200 um 0.55 NA PCF type gain fiber.

In an exemplary embodiment, to produce the double fiber optic mode adapter 300 depicted in FIG. 3, a transition fiber is provided that begins with a signal core matched to a PCF gain fiber core and that has a cladding that will match an input fiber bundle after thermal tapering. The transition fiber is then thermally tapered on the input side to match the input fiber bundle signal core (e.g., a 20 µm step index fiber (SIF).

This transition fiber is then taper etched such that the output outer diameter will match the Air Clad diameter of the PCF gain fiber.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A fiber optic amplifier system, comprising:
a first stage, comprising a first core fiber having a first core diameter and a first cladding size;
a second stage, comprising a second core fiber having a second core diameter and a second cladding size; and
a double mode adapter connecting the first stage to the second stage, wherein the double mode adapter is configured to provide a core transition from the first core diameter to the second core diameter through a thermally-tapered region of the double mode adapter and a cladding transition from the first cladding size to the second cladding size through both the thermally-tapered region and an etched taper region of the double mode adapter;
wherein the ratio of the first core diameter to the first cladding size is different from the ratio of the second core diameter to the second cladding size.

2. The fiber optic amplifier system according to claim 1, further comprising:
an input fiber connected to an input of the first stage; and
a delivery fiber connected to the output of the second stage.

3. The fiber optic amplifier system according to claim 2, further comprising:
a co-pumped combiner at the input of the first stage;
a combining tree connected to the co-pumped combiner; and
a laser diode pump array connected to the combining tree.

4. The fiber optic amplifier system according to claim 2, further comprising:
a counter-pumped combiner at the output of the second stage;
a combining tree connected to the counter-pumped combiner; and
a laser diode pump array connected to the combining tree.

5. The fiber optic amplifier system according to claim 2, further comprising:
a co-pumped combiner at the input of the first stage;
a first combining tree connected to the co-pumped combiner;
a counter-pumped combiner at the output of the second stage;
a second combining tree connected to the counter-pumped combiner; and
a laser diode pump array connected to the first and second combining trees.

6. The fiber optic amplifier system according to claim 1, wherein the first and second core fibers are polarization-maintaining (PM) Yb-doped Large Mode Area (LMA) Step Index Fibers (SIF).

7. The fiber optic amplifier system according to claim 6, wherein the first core fiber has a core diameter of approximately 20-25 µm, and the second core fiber has a core diameter of approximately 30-40 µm.

8. A fiber optic oscillator system, comprising:
a first stage, comprising a first core fiber having a first core diameter and a first cladding size;
a second stage, comprising a second core fiber having a second core diameter and a second cladding size; and
a double mode adapter connecting the first stage to the second stage, wherein the double mode adapter is configured to provide a core transition from the first core diameter to the second core diameter through a thermally-tapered region of the double mode adapter and a cladding transition from the first cladding size to the second cladding size through both the thermally-tapered region and an etched taper region of the double mode adapter; and
wherein the ratio of the first core diameter to the first cladding size is different from the ratio of the second core diameter to the second cladding size.

9. The fiber optic oscillator system according to claim 8, further comprising:
a mirror and a first fiber connected to an input of the first stage; and
a partially-reflective mirror and a second fiber connected to the output of the second stage.

10. The fiber optic oscillator system according to claim 9, further comprising:
a co-pumped combiner at the input of the first stage;

a combining tree connected to the co-pumped combiner; and a laser diode pump array connected to the combining tree.

11. The fiber optic oscillator system according to claim 9, further comprising:
  a counter-pumped combiner at the output of the second stage;
  a combining tree connected to the counter-pumped combiner; and
  a laser diode pump array connected to the combining tree.

12. The fiber optic oscillator system according to claim 9, further comprising:
  a co-pumped combiner at the input of the first stage;
  a first combining tree connected to the co-pumped combiner;
  a counter-pumped combiner at the output of the second stage;
  a second combining tree connected to the counter-pumped combiner; and
  a laser diode pump array connected to the first and second combining trees.

13. The fiber optic oscillator system according to claim 8, wherein the first and second core fibers are polarization-maintaining (PM) Yb-doped Large Mode Area (LMA) Step Index Fibers (SIF).

14. The fiber optic oscillator system according to claim 8, wherein the first core fiber has a core diameter of approximately 20-25 µm, and the second core fiber has a core diameter of approximately 30-40 µm.

\* \* \* \* \*